United States Patent [19]

Albers et al.

[11] Patent Number: 4,523,764
[45] Date of Patent: Jun. 18, 1985

[54] FLUID-SEALED SHAFT SEAL WITH BORES FOR SUPPLYING AND DISCHARGING FLUID

[75] Inventors: Rolf Albers, Oberhausen; Emil Aschenbruck, Duisburg; Günter Neuhaus; Joachim Kotzur, both of Oberhausen, all of Fed. Rep. of Germany

[73] Assignee: M.A.N. Maschinenfabrik Augsburg-Nürnberg Aktiengesellschaft, Fed. Rep. of Germany

[21] Appl. No.: 506,345

[22] Filed: Jun. 21, 1983

[30] Foreign Application Priority Data

Jun. 25, 1982 [DE] Fed. Rep. of Germany ....... 3223703

[51] Int. Cl.³ .................. F16J 15/38; F16J 15/40; F16J 15/48
[52] U.S. Cl. .......................... 277/3; 277/27; 277/74; 277/75; 277/72 FM; 277/96.1
[58] Field of Search ............. 277/3, 27, 71, 72 R, 277/72 FM, 74–76, 96, 96.1

[56] References Cited

U.S. PATENT DOCUMENTS

| 2,895,751 | 7/1959 | Standish | 277/74 X |
| 3,109,658 | 11/1963 | Barrett et al. | 277/96 X |
| 3,527,465 | 9/1970 | Guinard | 277/96.1 X |
| 3,804,424 | 4/1974 | Gardner | 277/74 X |

FOREIGN PATENT DOCUMENTS

| 524515 | 5/1931 | Fed. Rep. of Germany | 277/96.1 |
| 2134964 | 1/1972 | Fed. Rep. of Germany | |
| 2444544 | 8/1982 | Fed. Rep. of Germany | |
| 3223703 | 5/1984 | Fed. Rep. of Germany | |
| 830059 | 3/1960 | United Kingdom | 277/74 |
| 831168 | 3/1960 | United Kingdom | 277/3 |
| 1032864 | 6/1966 | United Kingdom | 277/75 |

Primary Examiner—Robert S. Ward
Attorney, Agent, or Firm—McGlew and Tuttle

[57] ABSTRACT

A fluid sealed shaft seal has a radial sealing gap formed between radial surfaces of a first seal ring rotating with a shaft, and a second stationary seal ring biased toward the first ring and connected over a packing element to a housing. The stationary seal ring carries at least one sealing fluid supply bore and at least one sealing fluid discharge bore for supplying and discharging sealing fluid to and from the gap, to maintain a gap width. Spiral grooves are provided radially outwardly or radially inwardly of the supply and discharge bores for supplying an auxiliary sealing fluid to establish a high pressure annular area to prevent escape of the sealing fluid from the gap.

14 Claims, 9 Drawing Figures

FLUID-SEALED SHAFT SEAL WITH BORES FOR SUPPLYING AND DISCHARGING FLUID

FIELD AND BACKGROUND OF THE INVENTION

The present invention relates in general to shaft seals, and in particular to a shaft seal using a sealing fluid and having an arrangement for preventing escape of the sealing fluid.

A fluid-sealed shaft seal is known from German OS No. 21 34 964. That prior art shaft seal operates with a single sealing gas, such as helium, nitrogen, or hydrogen. Outlets are provided in a seal ring in circular grooves, to ensure a uniform outflow and, in view of the very small width of the gap, a satisfactory discharge of the fluid. The supply bores are provided within supply grooves which are interrupted and which each extend on the seal ring over a sector of only about 5° to 15°. If a very expensive sealing fluid, such as helium, is employed, it is sought to recover the entire amount thereof. It has been found that in this prior art arrangement, larger amounts of sealing fluid fail to be collected by the discharge grooves and can still escape laterally through the sealing gap itself. It may be provided to produce an underpressure in the discharge grooves, however, this would further require bringing the underpressure into very accurate relationship with the excess pressure of the supplied sealing fluid, and would complicate the operating conditions calling for different specific pressure conditions. U.S. Pat. No. 3,527,465 shows a shaft seal but all of the sealing fluid is first recovered or collected.

SUMMARY OF THE INVENTION

The present invention is therefore directed to an improvement of a shaft seal of the above mentioned kind, which, however, insures that substantially the entire amount of sealing gas can be recovered and supplied again into the sealing fluid circuit, without complicated control equipment. All safety requirements for gas seal arrangements are to be satisfied at the same time.

Accordingly, an object of the present invention is to provide a fluid sealed device, for a shaft rotatable in a housing, comprising a first seal ring rotating with the shaft and having a radial surface, a second seal ring having a radial surface forming a radial gap with the first seal ring and connected to the housing over a packing element which biases the sealing rings toward each other, the second seal ring having at least one sealing fluid supply bore which communicates with the gap over a preferably segmented groove and a fluid discharge bore communicating with the gap over a groove which is at a different radial position. Sealing fluid is thus supplied and discharged from the gap for maintaining a gap width. Auxiliary fluid supply means are provided which communicate with the gap at a radial position either outside or inside the fluid supply and discharge bores. The auxiliary fluid supply means supplies an auxiliary fluid to establish a substantially annular area or zone of elevated pressure for preventing escape of the sealing fluid from the gap, either radially inwardly or radially outwardly.

With helium, it is sufficient to rise the fluid pressure very slightly, by about 1 to 10% above the pressure level of the ambience of the discharge bore. With other gases or liquids, the fluid pressure is correspondingly higher. A different (auxiliary) fluid can be used for building up the zone of elevated pressure than that used as a sealing fluid. The same fluid can also be used.

The inventive idea can be put into practice in various ways. Preferably, the zone of elevated fluid pressure is produced by means of spiral grooves which are provided in one of the seal rings in the peripheral and/or central portion of the sealing gap and in which pressure gradients ascending from the outside to the inside build up as one of the rings rotates relative to the other.

Such gap grooves in fluid-sealed shaft seals, particularly gas seals, are known per se (German OS No. 24 44 544). However, they are used in the prior art only for augmenting the dynamic pressure in the area of the depressions. Another advantage of this provision is the formation of small pressure cushions in the closed end portions of the grooves, contributing to a stabilization of the seal rings relative to each other during rotation. This effect benefits the inventive seal too. It is surprising, however, that the zone of elevated fluid pressure built up through the spiral grooves is instrumental in preventing the sealing fluid from escaping from the gap.

The same effect may be obtained by providing in at least one of the seal rings at least one spiral groove receding inwardly against the relative direction of rotation.

The zone of elevated fluid pressure may further be produced in the region of grooves, (preferably interrupted grooves) which communicate with bores opening therein and which are intended for supplying another fluid, and extend in one or both of the seal rings in the peripheral and/or central zone of the sealing gap. This further fluid may be an ordinary sealing fluid, not the costly one used as the main sealing fluid.

A small portion of the fluid escaping from the zone of elevated pressure is taken off with the sealing fluid through the outlet bores and is then separated therefrom again.

Accordingly, another object of the present invention is to provide a fluid sealed device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by it uses, reference is made to the accompanying drawings and descriptive matter in which preferred embodiments of the invention are illustrated.

BRIEF DESCRIPTION OF THE DRAWINGS

Some embodiments of the invention are shown in the drawings in which.

DESCRIPTION OF THE PREFERRED EMBODIMENTS

Figure 1:
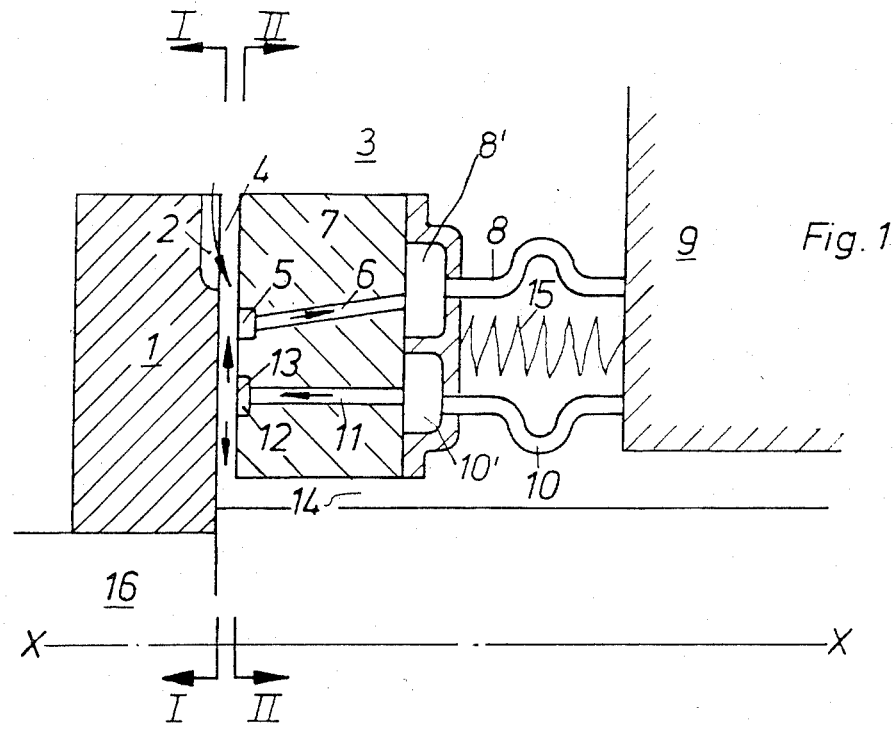
FIG. 1 is a sectional view of a first embodiment, showing the seal rings.

FIG. 1 shows a fluid-seal type shaft seal wherein a shaft 16 carries a flange-like seal ring 1 firmly secured thereto and rotating with the shaft the axis of which is indicated at X—X. The other part of the seal is a non-rotating seal ring 7. Rotating seal ring 1 is separated from non-rotating seal ring 7 by a sealing gap 4 having a width of 5 to 20 microns, for example. Non-rotating seal ring 7 is pressed toward the substantially planar front face of rotating seal ring 1, by an elastic packing element 15, which, in the shown example, is a circularly extending sealing diaphragm.

Sealing gap 4 is supplied with a liquid or gaseous sealing fluid, particularly helium, through a plurality of supply bores 11 distributed over the circumference of seal ring 7. Supply bores 11 open into sectorially distributed, sickle-shaped or sectional pockets 13 provided in the front surface of seal ring 7 as shown in FIG. 2b.

Spaced from pockets 13 by a distance corresponding to about the width of the pockets is a continuous circular groove 5 which is also provided in the front surface of seal ring 7, wherefrom discharge bores 6 lead out of the sealing gap at locations which are circumferentially distributed in accordance with the sectors of supply pockets 13. The pressurized sealing fluid is supplied and discharged through lines 8, 10 and corresponding distribution channels 8', 10' to and from bores 6, 11 respectively. The discharge fluid flows into a housing 9 and may then be separated from the other gases which are taken off simultaneously.

Figures 2A, 2B:
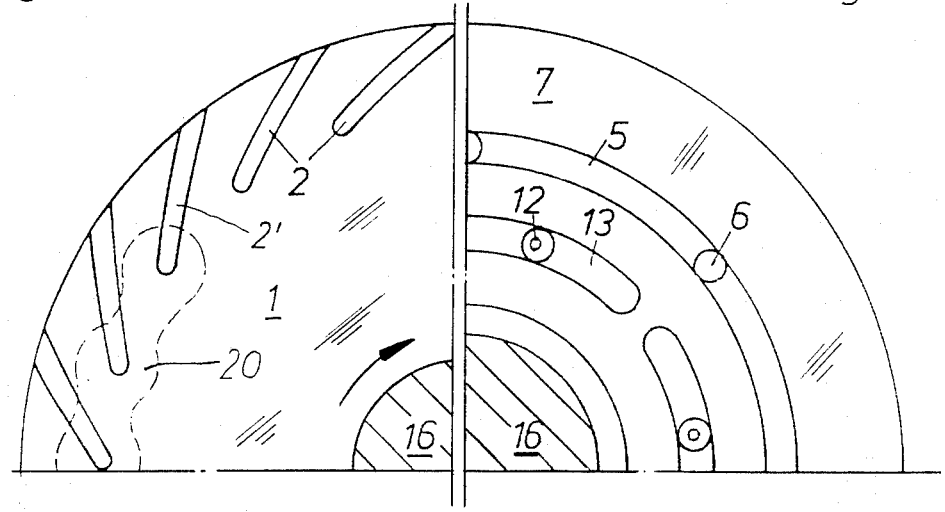
FIGS. 2a and 2b are front views of the two seal rings according to FIG. 1, taken respectively above lines I—I and II—II.

FIG. 2a is a partial front view of rotating seal ring 1. It will be understood that by means of the shown sickle-shaped or sectional spiral grooves 2 provided in the peripheral zone of the front surface of the seal ring, a series of cushion areas or zones 20 of elevated pressure may be produced at the end portions 2' of the grooves. The pressure is built up by gases of the ambience, forced into grooves 2 by rotation of ring 1. This ambient atmosphere may be air or air enriched with helium, for example. The zone of elevated pressure 20 is indicated by a broken line and forms a substantially annular area around the rings. This zone 20 improves the dynamic conditions of stability of the two seal rings which are urged against each other, preventing a mutual contact and also producing an increased pressure barrier for preventing the discharged sealing fluid (bore 11) from escaping radially to the outside. A similar zone may be produced by corresponding means in the central region of the sealing gap. Grooves 2 curve outwardly in the direction of rotation of ring 1.

In operation, the sealing fluid, such as helium, hydrogen, nitrogen, etc. is forced through bores 11 into the sickle-shaped pockets 13. The greatest part of the fluid is discharged through bores 6 and line 8. Relatively small amounts of the ambient atmosphere introduced into the gap through spiral grooves 2, may then be separated from the sealing fluid. Experience has shown that the discharged amount may be increased by extending spiral grooves 2 inwardly up to the radial level of discharge bores 6 and associated grooves 5. However, a large amount of the ambient atmospheric gas is then entrained, and also the above mentioned dynamic stability is reduced.

The other parts of this gas-sealed shaft seal substantially correspond to those disclosed in the above-mentioned German OS No. 24 44 544 and to commercial shaft seals of the same kind.

Throughout the figures, like numerals designate like or similar parts.

Figure 3:
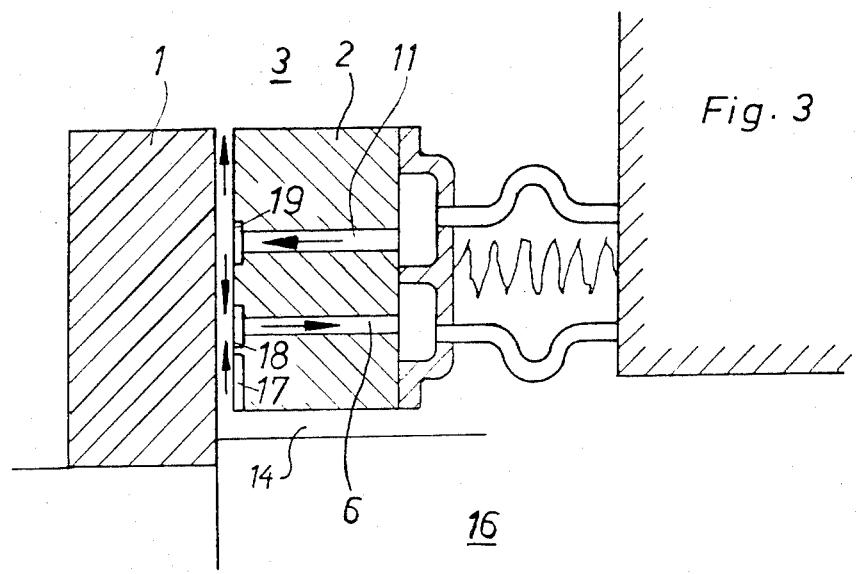
FIG. 3 is a view similar to FIG. 1 showing another embodiment.

FIG. 3 shows an embodiment in which cushion-building spiral groove 17, having a function analogous to peripheral grooves 2 of seal ring 1 according to the embodiment of FIG. 2a are provided in non-rotating seal ring 2 and in the central zone of the sealing gap. To the outside therefrom, a discharge groove 18 with a discharge bore 6, and a supply groove 19 with a supply bore 12 are shown. The gas amount escaping to the ambient space 3 may be reduced by means shown in FIG. 1. The spiral grooves 17 are curved outwardly in an opposite direction to the rotation of ring 1 to channel ambient atmosphere which is entrained by ring 1, outwardly toward groove 18. Escape of sealing fluid to inner space 14 is avoided by grooves 17.

Figure 4:
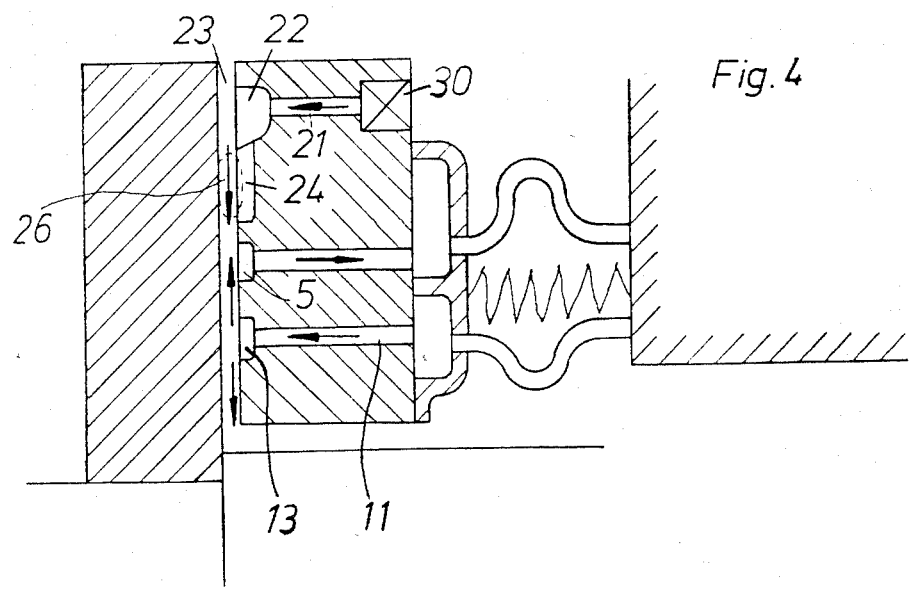
FIG. 4 is a view similar to FIG. 1 showing an embodiment with a filter provided upstream of a further supply bore.

FIG. 4 illustrates another embodiment. In this design, the zone of elevated fluid pressure is produced in the region of grooves 22 which are preferably interrupted and which substantially correspond to those shown in FIG. 2b at 13 and communicating with supply bores 12. Particularly in instances where soiling matter, abrasion particles, etc., in substantial amounts are to be kept away from gap 23, a further fluid, such as nitrogen or hydrogen, may be supplied through a filter element 30, so as to ensure that the amounts of further fluid remain absolutely free from foreign matter. Toward the inside, groove 22 may be followed by a series of fluid-conducting spiral grooves 24, so that in the region of supply bores 21 and spiral grooves 24, a zone of augmented fluid pressure is produced, as indicated at 26. Grooves 24 curve inwardly in the rotation direction of ring 1 to form the pressure zone 26.

Figure 5:
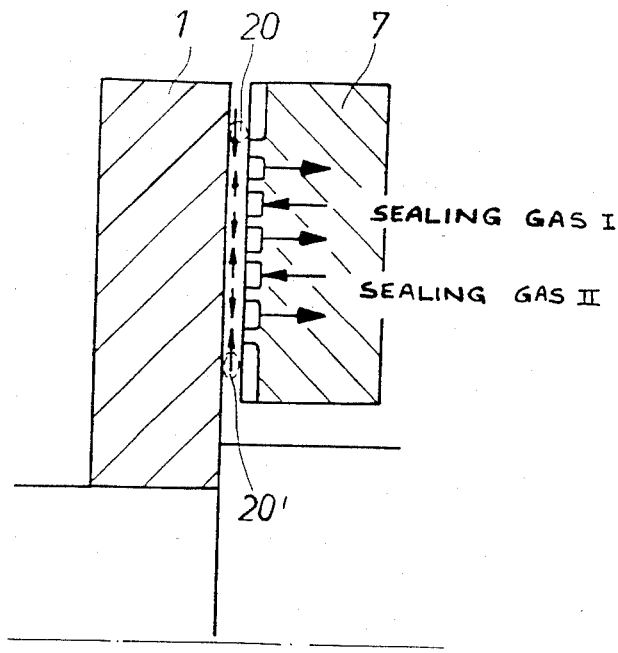
FIG. 5 is a schematic diagram showing still another embodiment.

FIG. 5 is a diagrammatical illustration of a design with two sealing fluids, I and II and with two zones of increased fluid pressure being produced by means of spiral grooves, one at the periphery and one at the central portion of seal ring 7, as indicated at 20 and 20'. In these zones gas cushions form in addition, contributing to a stabilization of seal rings 1 and 7 during high speed rotary motion.

The inventive shaft seal makes it possible to keep a very narrow gap between the seal rings even at high speeds, and to completely recover valuable sealing fluids at the same time.

Figure 6:
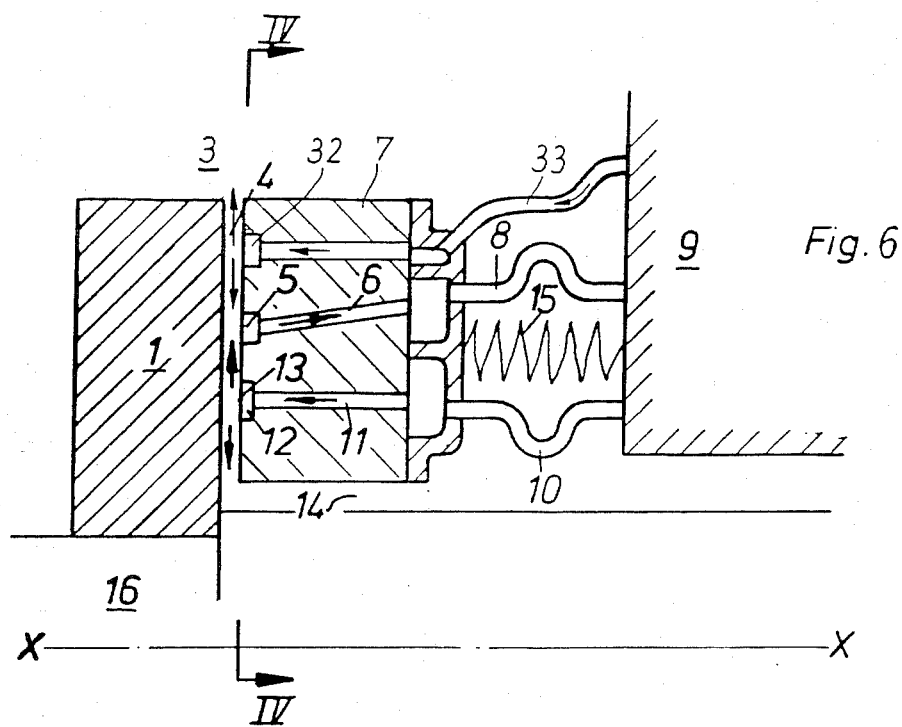
FIG. 6 is a view similar to FIG. 1 showing an embodiment with further supply bores.
Figure 6A:
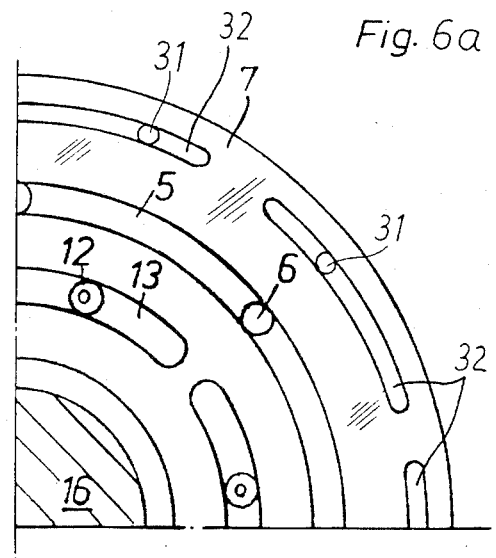
FIG. 6a is a view taken along line IV—IV of FIG. 6.

FIGS. 6 and 6a show another design which produces a zone of elevated fluid pressure in sealing gap 4, in the peripheral region of seal ring 7. This is done by means of interrupted grooves 32 communicating with further supply bores 31 through which another fluid is supplied from a line 33. FIG. 6a is a partial front view of seal ring 7. Three rows of grooves or pockets are shown, of which the continuous one in the middle serves the purpose of discharging fluid, while the other two supply separately two sealing fluids. The fluids are the same or different. The fluid of the outer grooves 32 may be a cheaper fluid to save the more costly fluid of inner grooves 13.

Figure 7:
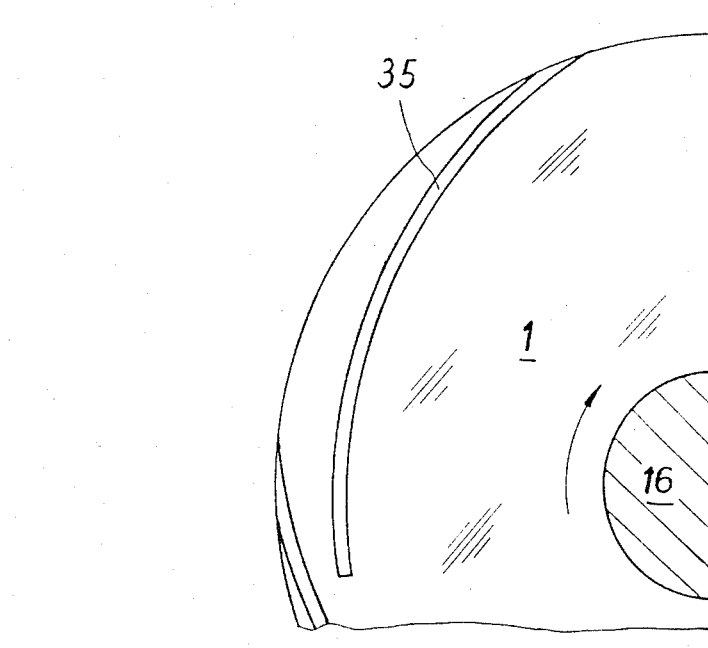
FIG. 7 is a front view of a seal ring provided with a spiral groove.

FIG. 7 illustrates the possibility of producing the zone of elevated fluid pressure in the end region of one or more spiral grooves 35 which recede inwardly and extend from the periphery against the direction of rotation, and are provided in the shown example, in seal ring 1.

While specific embodiments of the invention have been shown and described in detail to illustrate the application of the principles of the invention, it will be understood that the invention may be embodied otherwise without departing from such principles.

What is claimed is:

1. A fluid sealed device for a shaft rotatable in a housing, comprising:
   a first seal ring rotatating with the shaft having a radial surface;
   a second seal ring having a radial surface defining a radial gap with said first seal ring radial surface;
   a packing element connected between the housing and said second seal ring for biasing said second seal ring toward said first seal ring to close said gap;
   said second seal ring having at least one sealing fluid supply bore having a supply opening communicating with said gap and a fluid discharge bore having a discharge opening communicating with said gap at a different radial position from said supply opening;
   sealing fluid supply means connected to said at least one sealing fluid supply bore for supplying sealing fluid to said gap for acting against the biasing of said packing element; and
   auxiliary fluid supply means communicating with said gap at a radial position other than that of said supply and discharge openings, for supplying auxiliary fluid to said gap to form a substantially annular zone of elevated pressure with respect to a pressure of said sealing fluid at said discharge opening for reducing escape of sealing fluid radially from said gap.

2. A device according to claim 1, wherein said auxiliary fluid supply means comprise a plurality of spiral grooves defined in one of said radial surfaces extending in a direction with respect to a rotational direction of said first seal ring for forming the substantially annular zone of elevated pressure.

3. A device according to claim 2, wherein each spiral groove has an inlet end for receiving auxiliary fluid and an outlet end closer to a circular path of said fluid discharge bore in said gap.

4. A device according to claim 3, wherein said spiral grooves are defined in said first seal ring radial surface and opened outwardly in the same direction as a direction of rotation of said first seal ring.

5. A device according to claim 3, wherein said spiral grooves are defined on said second seal ring radial surface.

6. A device according to claim 5, wherein said spiral grooves each have an inlet and an outlet opening positioned radially inwardly of said at least one fluid discharge bore, said spiral grooves opening radially inwardly in a direction opposed to a rotation direction of said first seal ring.

7. A device according to claim 6, wherein said second seal ring radial surface includes a second plurality of spiral grooves defined therein radially outwardly of said supply and discharge openings and opening radially outwardly in a direction opposed to a rotation direction of said first seal ring.

8. A device according to claim 5, wherein said spiral grooves are defined on said second seal ring radial surface at a radial position outside said supply and discharge openings.

9. A device according to claim 8, wherein said auxiliary fluid supply means includes said second seal ring having an auxiliary fluid supply bore extending therethrough at a radial position outside said sealing fluid supply bore and said fluid discharge bore, for supplying auxiliary fluid to said gap.

10. A device according to claim 9, including a filter in said auxiliary fluid supply bore.

11. A device according to claim 3, wherein said outlet end of each spiral groove ends at least partly in a path of rotation of said fluid discharge bore.

12. A device according to claim 1, wherein said auxiliary fluid supply means comprise at least one auxiliary fluid supply bore extending through one of said first and second seal rings and communicating with said gap over a segmented circular groove, said second seal ring radial surface including at least one sealing fluid supply groove communicating with said sealing fluid supply bore and at least one discharge groove communicating with said fluid discharge bore, said auxiliary fluid segmented groove positioned at a radial position which is one radially outwardly and radially inwardly of said sealing fluid supply and discharge grooves.

13. A device according to claim 12, wherein said fluid discharge groove extends in a closed ring around said second seal ring radial surface, said sealing fluid supply groove being segmented with a supply opening communicating with each segmented sealing fluid supply groove.

14. A device according to claim 1, including at least two sealing fluid supply bores each for carrying a different sealing fluid, and at least two fluid discharge bores, each supply and discharge bore communicating over an opening of said gap, said auxiliary fluid supply means comprising a first plurality of spiral grooves defined on a radially outer peripheral area of one of said radial surfaces and a second plurality of spiral grooves defined on a radially inwardly peripheral surface of one of said radial surfaces for defining a pair of substantially annular zones of elevated pressure with all of said fluid bores positioned between said zones of elevated pressure.

* * * * *